United States Patent Office 3,781,244
Patented Dec. 25, 1973

3,781,244
PROCESS FOR PREPARING EPOXIDIC RESINS
Silvio Vargiu and Mario Pitzalis, Milan, Italy, assignors to Societa Italiana Resine S.p.A., Milan, Italy
No Drawing. Filed Apr. 24, 1972, Ser. No. 247,165
Claims priority, application Italy, Apr. 30, 1971, 23,913/71
Int. Cl. C08g 30/04
U.S. Cl. 260—47 EP                              7 Claims

ABSTRACT OF THE DISCLOSURE

Improved epoxy resins, for electrical and other purposes, are prepared in a two-stage process in which an intermediate epoxy product is prepared from epichlorohydrin and 2,2'-bis(4-hydroxycylohexyl) propane in the presence of sodium hydroxide in equivalent quantities with respect to the epichlorohydrin, and the product is caused to react with a further quantity of bisphenol A until epoxy resins are obtained which have epoxy equivalents in excess of approximately 1,000.

---

The present invention relates to a new class of epoxy resins having high epoxy equivalents and to the process for manufacturing the same.

It is known that epoxy resins are obtained commercially by reacting polyphenols and halohydrins; 2,2-bis-(4-hydroxyphenyl) propane (bisphenol A) and epichlorohydrin are normally used for the purpose, and the epoxy resins are prepared by a two-stage process.

More particularly, at a first reaction stage, an intermediate epoxy product is prepared from epichlorohydrin and bisphenol A in the presence of sodium hydroxide in equivalent quantities with respect to the epichlorohydrin. An intermediate epoxy product is thus obtained which is caused to react with a further quantity of bisphenol A until epoxy resins are obtained which have epoxy equivalents in excess of approximately 1,000.

Such resins with a high epoxy equivalent are useful for various purposes, such as for example in the field of paints, varnishes and adhesives, or in moulding compositions, together with resinous products of the phenol or amine type.

Such epoxy resins are not, however, fully satisfactory particularly on account of their high viscosity values, these being a factor which constitutes a limitation on their practical use or in any event creates various difficulties in actual use.

In addition, the characteristic features of such resins are not generally such as to render them useful in certain particular fields of use, for example in electronics.

Finally, the resins obtained by the process described are highly reactive, to the extent that, under the conditions of use, they exhibit high curing rates and this may be a drawback, particularly when they are used in large quantities.

It has now been found possible to avoid or at least substantially to reduce the disadvantages described, by using a new class of epoxy resins.

It is therefore an object of the present invention to provide epoxy resins which belong to a new class, having values of the epoxy equivalent equal to or greater than 900 up to approximately 2,000, which have low levels of viscosity and relatively low values of curing rate, and which are capable of being used for various purposes, particularly in the electronics field.

The process for the manufacture of such epoxy resins constitutes another object of the present invention.

Other objects of the present invention will become apparent from the following description.

According to the present invention, epoxy resins are prepared by a process which consists essentially in causing bisphenol A to react with an epoxy product obtained by dehydrochlorinating the products of reaction of epichlorohydrin and 2,2'-bis(4-hydroxycyclohexyl) propane.

More particularly according to the process of the present invention, 2,2'-bis(4-hydroxycyclohexyl) propane and epichlorohydrin are first caused to react in the presence of alkylation catalysts of the boron trifluoride type, advantageously in the form of etherified boron trifluoride.

Preferably for this purpose, in a period of time ranging from 8 to 16 hours, epichlorohydrin in a quantity of 5 to 10 mols for every mol of 2,2'-bis(4-hydroxycyclohexyl) propane is added to 2,2' - bis(4 - hydroxycyclohexyl) propane containing from 0.04 to 1.0% by weight of the catalyst, while the temperature is maintained at between 120 and 160° C.

On completion of such reaction, an inorganic base, normally sodium hydroxide or potassium hydroxide, in solid sub-divided form and in a quantity from 2 to 3 mols to one mol 2,2'-bis(4-hydroxcyclohexyl) propane, is added to the mixture.

The inorganic base is homogeneously dispersed in the mass and maintained in contact for a time ranging from 4 to 8 hours and at a temperature between 80 and 160° C.

On completion of treatment, the mass is extracted by means of an organic solvent of the toluene, xylene or acetone type and from the extracted phase, the solvent is evaporated under reduced pressure.

Thus, a residue is obtained which consists of an intermediate epoxy product having characteristics comprised within the following ranges:

Epoxy equivalent _____ From 250 to 350.
Viscosity in cps. at 25° C., 40 wt.
  percent solution in butylcarbitol _____ From 2,500 to 4,500
Gelling time at 25° C. _____ From 3 to 4 hours.

According to the process of the present invention, this intermediate product is caused to react with bisphenol A in order to obtain a solid epoxy resin with a low melting point, with values of epoxy equivalent equal to or greater than approximately 900 and up to 2,000, and having low viscosity levels.

More particularly, 10 to 30 parts by weight of bisphenol A are homogenized to 100 parts by weight of the intermediate epoxy product and reaction is performed under temperatures of 150 to 180° C., for periods of 4 to 12 hours.

It has been found that various advantages can be obtained by the process of the present invention, causing the reaction of bisphenol A and the intermediate epoxy product to be carried out in the presence of catalytic quantities of tertiary amines or quarternary ammonium bases. Such catalysts in fact make it possible to keep to short reaction times and to control the properties of the final epoxy resin, such as for example the degree of crosslinking, when they are added in quantities from 0.25 to 2.0% and preferably 0.5 to 1.5% by weight of the intermediate epoxy product.

Among the catalysts which belong to the aforesaid classes, benzyldimethylamine, trimethylamine, tetraethylammonimhydroxide and benzyltrimethylammoniumhydroxide have been found particularly useful. In the preferred embodiment, the catalysts described are added gradually during the reaction of the bisphenol A and the intermediate epoxy product.

In any case, by using the process according to the present invention, epoxy resins are produced, the properties of which fall within the following ranges

| | |
|---|---|
| Epoxy equivalent | From 900 to 2,000. |
| Melting temperature | From 35° to 55° C. |
| Viscosity in cps. at 25° C., at a concentration of 40% in butylcarbitol | From 60 to 160. |

The epoxy resins prepared by the process described have, above all, low values of viscosity and melting point, notwithstanding the high value of the epoxy equivalent. In addition, such resins have, in use a higher resistance to heat and to atmospheric agents than the conventional resins obtained by reaction of bisphenol A and epichlorohydrin.

Another improved feature of the resins of the present invention resides in the fact that they have a more stable dielectric dissipation factor upon fluctuations in temperature, so that they are particularly useful for electrical applications for the production of laminates, printed circuits, paper-backed varnishes for electrical insulators and castings for electrical use with a substantial quantity of filler.

Furthermore, the resins described have longer curing times in combination with conventional curing agents, which is a particular advantage where large quantities of resin are used. Finally, it has been found that in the use of the resins of the present invention in combination with conventional resins produced from bisphenol A and epichlorohydrin, hardened products are obtained which have improved mechanical properties compared with hardened products obtained with conventional resins alone.

EXAMPLE 1

Into a flask fitted with an agitator, reflux cooler and a thermometer, are introduced 250 g. of 2,2'-bis(4-hydroxycyclohexyl) propane, which are heated in a stream of nitrogen to a temperature of 135° C. In 5 minutes, 1.5 g. of etherified boron trifluoride are added to the mass which is kept under agitation at the temperature stated.

Then, over 3 hours, 510 g. epichlorohydrin are added to the mixture, thet aforesaid temperature being maintained by dispersing the heat which develops during reaction.

After this period, the temperature is brought to 90° C. and 87 g. sodium hydroxide are added, the mixture being briskly agitated in order to achieve perfect homogenisation.

After 5 hours of contact, the epoxy product is extracted with xylene.

From the solution, the xylene is then distilled, a pressure of 5 to 10 mm. Hg being maintained. An intermediate epoxy product is left as the residue and has the following properties:

| | |
|---|---|
| Epoxy equivalent | 275. |
| Gelling time at 25° C. | Approx. 3 hours. |
| Viscosity in cps. at 25° C. in a 40% solution in butylcarbitol | 3,500. |

EXAMPLE 2

In a flask fitted with an agitator, cooler and thermometer are placed 400 g. of the intermediate epoxy product prepared as described in Example 1. The mixture is heated under agitation and in a nitrogen atmosphere to a temperature equal to 120 to 130° C. Then, 65 g. of bisphenol A are added and the mass is heated up to 150° C.

When this temperature is reached, addition of the catalyst consisting of benzyl dimethylamine is started, this catalyst being supplied gradually over 35 minutes and in a total quantity equal to 3 g.

The progress of reaction is checked by measuring the epoxy equivalent from time to time and the reaction is continued until this value is constant in the products of reaction.

Under these conditions, an epoxy resin is obtained which has the following properties:

| | |
|---|---|
| Epoxy equivalent | 37 to 39° C. |
| Melting point | 950. |
| Viscosity in cps. at 25° C. in a 40% solution in butylcarbitol | 100 to 110. |

EXAMPLE 3

450 g. of the intermediate epoxy product obtained as described in the first example are placed in a flask and the temperature is raised to 130 to 140° C. while a nitrogen atmosphere is maintained. Then, 85 g. of bisphenol A are added and the temperature is raised to 160° C.

When this temperature is reached, addition of the catalyst consisting of benzyldimethylamine is commenced and spread gradually over a period of 50 minutes, the total quantity being equal to 4.5 g. The progress of the reaction is monitored by measuring the epoxy equivalent from time to time and the reaction is continued until this value is constant in the products of reaction. Under these conditions, an epoxy resin is obtained which has the following characteristics:

| | |
|---|---|
| Epoxy equivalent | 1,200. |
| Melting point | 42 to 44° C. |
| Viscosity in cps. at 25° C. in a 40% solution in butylcarbitol | 125 to 130. |

EXAMPLE 4

500 g. of the intermediate epoxy product obtained as described in the first example are placed in a flask and the temperature brought to 160° C., a nitrogen atmosphere being maintained. Then, 110 g. of bisphenol A are added and the temperature raised to 180° C. When this temperature is reached, addition of the catalyst, consisting of benzyldimethylamine, commences and is continued over a period of 80 minutes, the total quantity of catalyst being equal to 5 g.

The progress of reaction is checked by measuring the epoxy equivalent from time to time and the reaction is continued until this value becomes constant in the products of reaction.

Under these conditions, an epoxy resin is obtained which has the following characteristics:

| | |
|---|---|
| Epoxy equivalent | 1,400. |
| Melting point | 52 to 54° C. |
| Viscosity in cps. at 25° C. in a 40% solution in butylcarbitol | 140 to 145. |

EXAMPLE 5

First, an intermediate epoxy product of epichlorohydrin and bisphenol A is prepared in the presence of sodium hydroxide in equivalent molar quantity to the epichlorohydrin.

Into a stainless steel reactor fitted with an effective agitator and heating and cooling coils, are placed 1190 g. of 2,2'-bis(4-hydroxyphenyl) propane and 723 g. of epichlorohydrin. The mixture is heated under nitrogen to approximately 100° C. until a clear solution is obtained. While the temperature is maintained at approximately 100° C., 307 g. of sodium hydroxide in 4.5 litres of water are added over a period equal to approximately 90 minutes. When addition of the caustic soda is completed, the temperature is maintained for a further 20 minutes while stirring is continued. The product of reaction is then dissolved in toluene and washed with deionised water until the inorganic products are eliminated. The organic solvent is then eliminated by evaporation at reduced pressure and an intermediate epoxy product is obtained which has the following properties:

Epoxy equivalent _____ 500.
Melting point _____ 48 to 52° C.
Viscosity in cps. at 25° C., 40 wt. percent
  solution in butylcarbitol _____ 100 to 150.

400 g. of this intermediate epoxy product obtained as described are agitated in a stream of nitrogen at a temperature of 120 to 130° C. to 42 g. of 2,2′-bis(4-hydroxyphenyl) propane are then added and the mixture heated to 150° C.

When this temperature has been reached, addition of the catalyst, which consists of benzyldimethylamine, commences, such addition being gradual and spread over 35 minutes, the total quantity added being equal to 3 g.

The progress of reaction is checked by measuring the epoxy equivalent from time to time and the reaction is continued until this value becomes constant in the products of reaction.

Under these conditions, an epoxy resin is obtained which has the following properties:

Epoxy equivalent _____ 950.
Melting point _____ 74 to 77° C.
Viscosity in cps. at 25° C. in a 40% solution in butylcarbitol _____ 500 to 550.

What we claim is:

1. A process for the manufacture of epoxy resins having values of epoxy equivalent ranging from 900 to 2,000 and having low values of viscosity comprising:
   (a) reacting epichlorohydrin and 2,2′-bis(4-hydroxycyclohexyl) propane in the presence of an alkylation catalyst at temperatures from 120 to 150° C. for from 8 to 16 hours, the molar ratio of said epichlorohydrin to said 2,2′-bis(4-hydroxycyclohexyl) propane being from 5:1 to 10:1, followed by adding to the reaction mixture an inorganic base in a quantity of 2 to 3 moles per mole of said 2,2′-bis(4-hydroxycyclohexyl) propane and maintaining said mixture at temperatures from 80 to 160° C. for 4 to 8 hours and then extracting the resultant epoxy product with a solvent, thereby to produce an intermediate epoxy product having an epoxy equivalent of 250 to 350, a viscosity at 25° C. as a 40 weight percent solution in butylcarbitol of 2500 to 4500 cps., and a gelling time at 25° C. of 3 to 4 hours; and
   (b) reacting the said intermediate epoxy product with a quantity of 10 to 30 parts by weight of 2,2′-bis(4-hydroxyphenyl) propane to 100 parts by weight of said intermediate epoxy product at a temperature of from 150 to 180° C. and for a period of from 4 to 12 hours in the presence of catalytic quantities of an organic compound selected from the group consisting of tertiary amines and quaternary ammonium bases.

2. The process of claim 1 wherein said alkylation catalyst is present in an amount of from 0.04 to 1.0% by weight relative to the 2,2′ - bis(4 - hydroxycyclohexyl) propane.

3. The process of claim 1 wherein said alkylation catalyst is boron trifluoride.

4. The process of claim 1 wherein said alkylation catalyst is etherified boron fluoride.

5. The process of claim 1 wherein said organic compound of step (b) is present in an amount of from 0.25 to 2.0% by weight relative to said intermediate epoxy product.

6. The process of claim 1 wherein said organic compound of step (b) is selected from the group consisting of benzyldimethylamine, trimethylamine, tetra methylammoniumhydroxide and benzyltrimethyl ammonium hydroxide.

7. The process of claim 1 wherein said solvent of step (a) is selected from the group consisting of toluene, xylene and acetone.

References Cited
UNITED STATES PATENTS
3,634,323    1/1972    Moran, Jr.

HAROLD D. ANDERSON, Primary Examiner
T. E. PERTILLA, Assistant Examiner

U.S. Cl. X.R.
260—348.6